(12) United States Patent
Parks

(10) Patent No.: US 10,696,316 B1
(45) Date of Patent: Jun. 30, 2020

(54) STAIR-CLIMBING STROLLER

(71) Applicant: Douglas Parks, Brooklyn, NY (US)

(72) Inventor: Douglas Parks, Brooklyn, NY (US)

(*) Notice: Subject to any disclaimer, the term of this patent is extended or adjusted under 35 U.S.C. 154(b) by 242 days.

(21) Appl. No.: 15/973,599

(22) Filed: May 8, 2018

(51) Int. Cl.
*B62B 9/02* (2006.01)
*B62B 5/00* (2006.01)
*B62B 9/14* (2006.01)
*B62D 55/125* (2006.01)
*B62B 9/20* (2006.01)
*B62D 55/04* (2006.01)
*B62D 55/24* (2006.01)
*B62B 7/04* (2006.01)
*B62B 9/10* (2006.01)

(52) U.S. Cl.
CPC .............. *B62B 9/02* (2013.01); *B62B 5/0033* (2013.01); *B62B 7/04* (2013.01); *B62B 9/102* (2013.01); *B62B 9/14* (2013.01); *B62B 9/20* (2013.01); *B62D 55/04* (2013.01); *B62D 55/125* (2013.01); *B62D 55/24* (2013.01); *B62B 2205/12* (2013.01); *B62B 2205/14* (2013.01); *B62B 2206/006* (2013.01); *B62B 2206/06* (2013.01)

(58) Field of Classification Search
CPC .... B62B 9/02; B62B 9/04; B62B 9/14; B62B 9/142; B62B 9/20; B62B 7/04; B62B 7/06; B62B 5/0033; B62B 5/0036; B62B 5/0026; B62B 5/02; B62B 5/025; B62B 2205/12; B62B 2205/14; B62B 2206/006; B62B 2206/06; B62D 55/02; B62D 55/04; B62D 55/075; B62D 55/125; B62D 55/24; A61G 5/06; A61G 5/061; A61G 5/066
See application file for complete search history.

(56) References Cited

U.S. PATENT DOCUMENTS

| | | | | |
|---|---|---|---|---|
| 2,770,464 | A | | 11/1956 | Mittendrein |
| 3,166,138 | A | * | 1/1965 | Dunn, Jr. ............... A61G 5/061 180/9.23 |
| 3,288,234 | A | * | 11/1966 | Feliz ..................... A61G 5/023 180/6.5 |
| 3,346,062 | A | * | 10/1967 | Richison ............... A61G 5/066 180/6.7 |
| 3,432,178 | A | | 3/1969 | Xander |
| 3,871,701 | A | * | 3/1975 | Gesslein ................ B62B 7/123 296/97.21 |
| 4,564,080 | A | * | 1/1986 | Pagett .................... A61G 5/061 180/8.2 |
| 4,566,551 | A | * | 1/1986 | Feliz ..................... A61G 5/061 180/9.1 |

(Continued)

*Primary Examiner* — Jacob D Knutson
*Assistant Examiner* — Maurice L Williams
(74) *Attorney, Agent, or Firm* — Kyle A. Fletcher, Esq.

(57) ABSTRACT

The stair-climbing stroller is a baby stroller with retractable front and rear wheels for use on flat travel surfaces and a pair of tracks for use on inclined travel surfaces including, but not limited to, staircases. The front wheels are coupled to a pivoting front wheel support shaft and the rear wheels are coupled to a pivoting rear wheel support shaft. A wheel retract motor located on the underside of the stroller may cause a retraction drive shaft to pivot the front and rear wheel support shafts, retracting the wheels. When the front and rear wheels retract, the stroller may be lowered such that the left and right track rest on the ground. Left and right track motors may then be used to drive the stroller up an inclined travel surface using the tracks.

19 Claims, 6 Drawing Sheets

(56) References Cited

U.S. PATENT DOCUMENTS

| | | | |
|---|---|---|---|
| 4,687,068 A * | 8/1987 | Pagett | A61G 5/061 180/8.2 |
| 4,747,457 A * | 5/1988 | Buscaiolo | B62D 51/007 180/19.1 |
| 4,770,429 A | 9/1988 | Freyman | |
| 5,269,544 A | 12/1993 | Park | |
| 5,577,567 A | 11/1996 | Johnson | |
| 7,384,046 B2 | 6/2008 | Georges | |
| 8,459,660 B2 | 6/2013 | Livingston | |
| 8,777,311 B1 * | 7/2014 | Laurel, Jr. | A47D 1/00 297/217.3 |
| 9,669,860 B2 | 6/2017 | Zhou | |
| 2003/0116927 A1 * | 6/2003 | Quigg | A61G 5/061 280/5.22 |
| 2003/0183428 A1 * | 10/2003 | Hedeen | A61G 5/061 180/9.32 |
| 2004/0129306 A1 * | 7/2004 | Jefferson | A61G 5/10 135/96 |
| 2006/0038360 A1 * | 2/2006 | Negishi | A61G 5/061 280/5.2 |
| 2006/0284456 A1 * | 12/2006 | Compton | B60N 2/286 297/184.13 |
| 2007/0095581 A1 * | 5/2007 | Chambliss | A61G 5/066 180/8.2 |
| 2008/0042474 A1 * | 2/2008 | Dickie | B62B 7/06 297/16.2 |
| 2008/0053332 A1 * | 3/2008 | Roy | B60F 1/043 105/215.1 |
| 2008/0067762 A1 * | 3/2008 | Rembos | A61G 5/02 280/5.22 |
| 2009/0066123 A1 * | 3/2009 | Kassai | A47D 9/00 297/184.13 |
| 2009/0101042 A1 * | 4/2009 | Foote | B60F 1/043 105/215.1 |
| 2009/0160162 A1 * | 6/2009 | Bizzell | B62B 7/06 280/642 |
| 2011/0031045 A1 * | 2/2011 | Underwood | A61G 5/066 180/9.5 |
| 2011/0175302 A1 | 7/2011 | Sherman | |
| 2012/0286547 A1 * | 11/2012 | Gibbons | A47D 13/02 297/184.11 |
| 2018/0132446 A1 * | 5/2018 | Jakubowski | A01K 1/0236 |

\* cited by examiner

STAIR-CLIMBING STROLLER

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of baby accessories, more specifically, a stair-climbing stroller.

SUMMARY OF INVENTION

The stair-climbing stroller is a baby stroller with retractable front and rear wheels for use on flat travel surfaces and a pair of tracks for use on inclined travel surfaces including, but not limited to, staircases. The front wheels are coupled to a pivoting front wheel support shaft and the rear wheels are coupled to a pivoting rear wheel support shaft. A wheel retract motor located on the underside of the stroller may cause a retraction drive shaft to pivot the front and rear wheel support shafts, retracting the wheels. When the front and rear wheels retract, the stroller may be lowered such that the left and right track rest on the ground. Left and right track motors may then be used to drive the stroller up an inclined travel surface using the tracks.

An object of the invention is to provide a stroller that is capable of traversing an included surface, such as a staircase.

Another object of the invention is to provide retractable front and rear wheels for use on flat travel surfaces.

A further object of the invention is to provide left and right tracks for use on inclined travel surfaces.

Yet another object of the invention is to batteries, motors, and operator controls to control retraction of the wheels and movement on the tracks.

These together with additional objects, features and advantages of the stair-climbing stroller will be readily apparent to those of ordinary skill in the art upon reading the following detailed description of the presently preferred, but nonetheless illustrative, embodiments when taken in conjunction with the accompanying drawings.

In this respect, before explaining the current embodiments of the stair-climbing stroller in detail, it is to be understood that the stair-climbing stroller is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the stair-climbing stroller.

It is therefore important that the claims be regarded as including such equivalent construction insofar as they do not depart from the spirit and scope of the stair-climbing stroller.

It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description. As used herein, the word "or" is intended to be inclusive.

Figure 1:
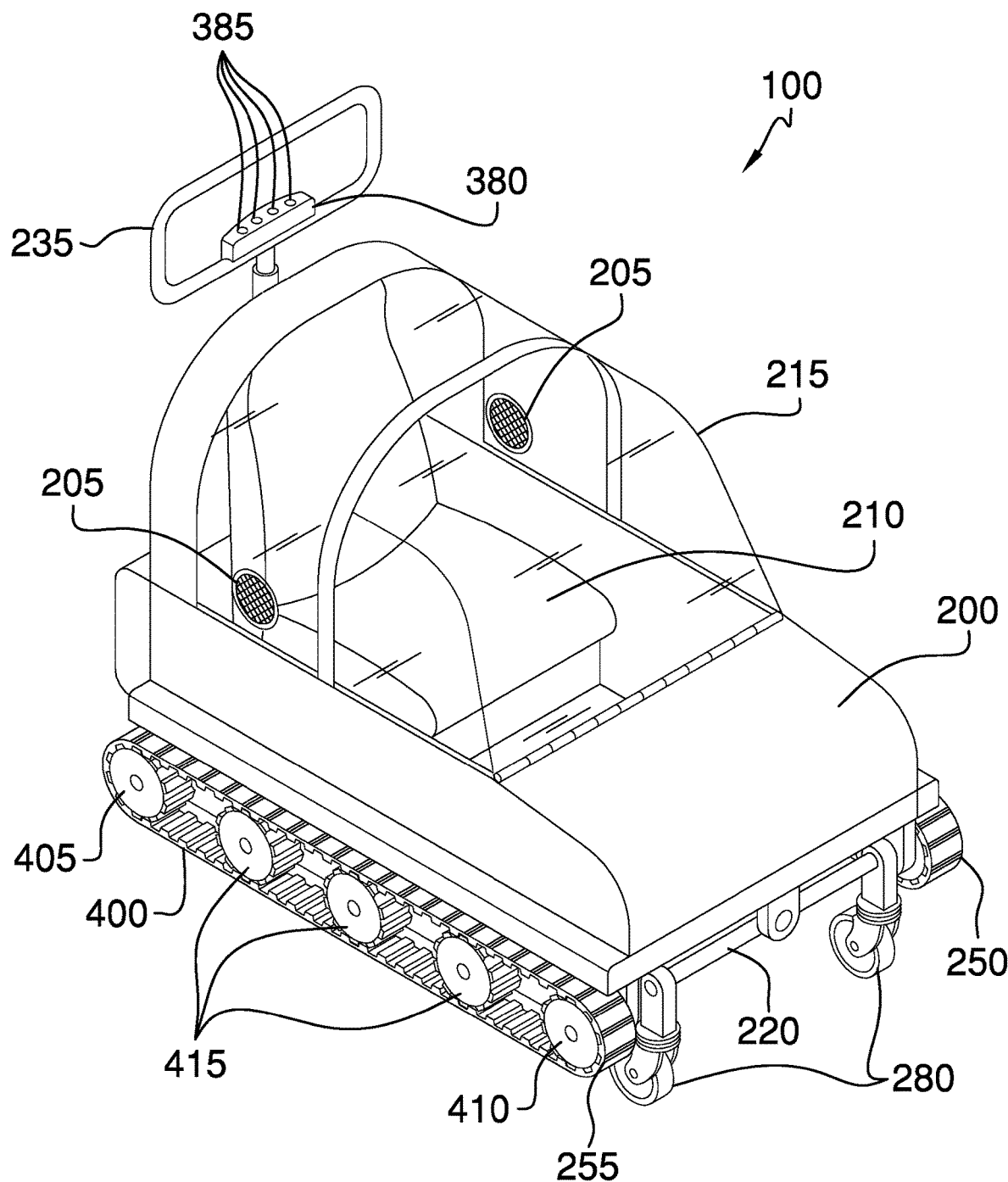
FIG. 1 is a front perspective view of an embodiment of the disclosure.
Figure 2:
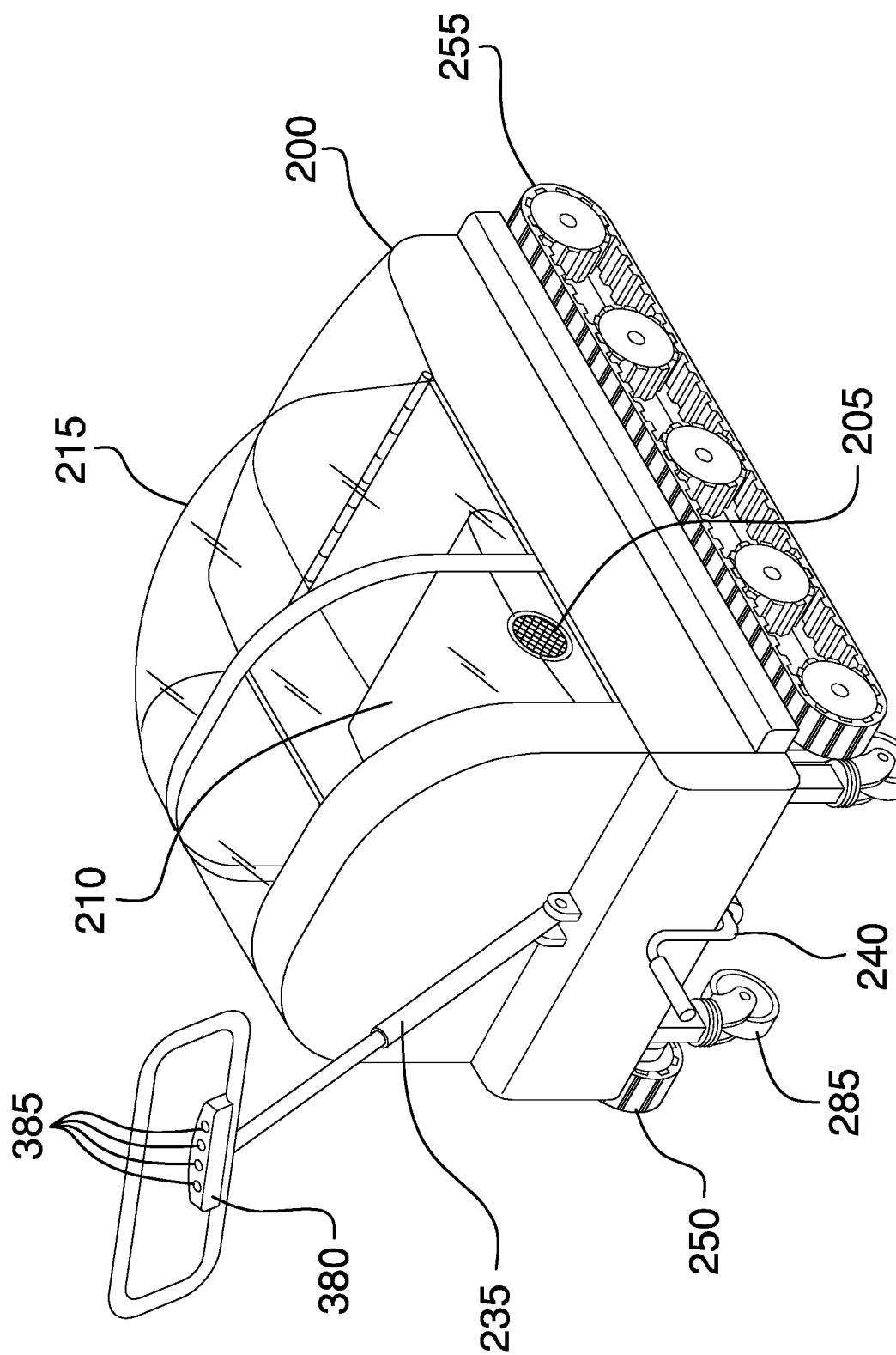
FIG. 2 is a rear perspective view of an embodiment of the disclosure.
Figure 3:
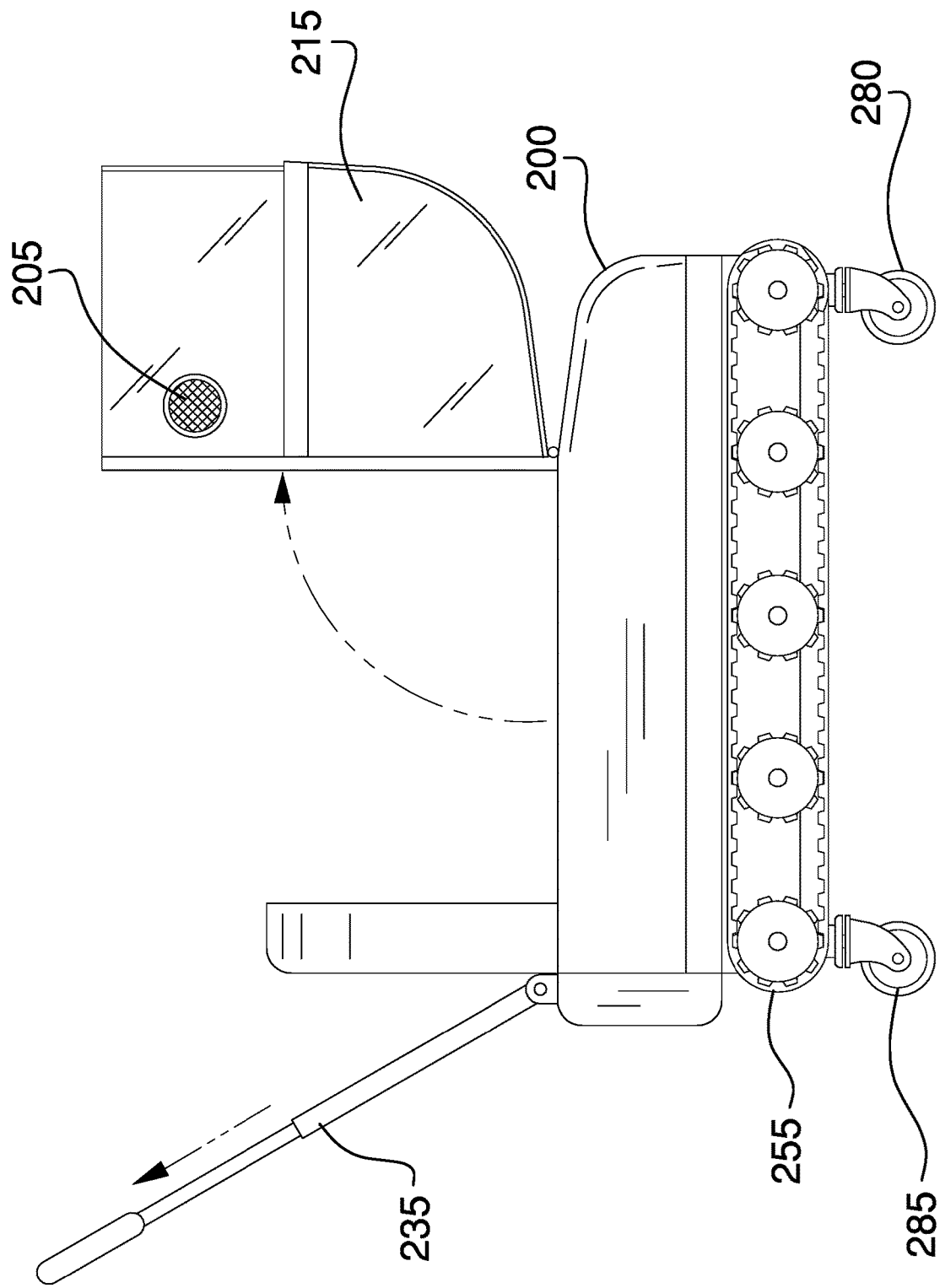
FIG. 3 is a side view of an embodiment of the disclosure.
Figure 4:
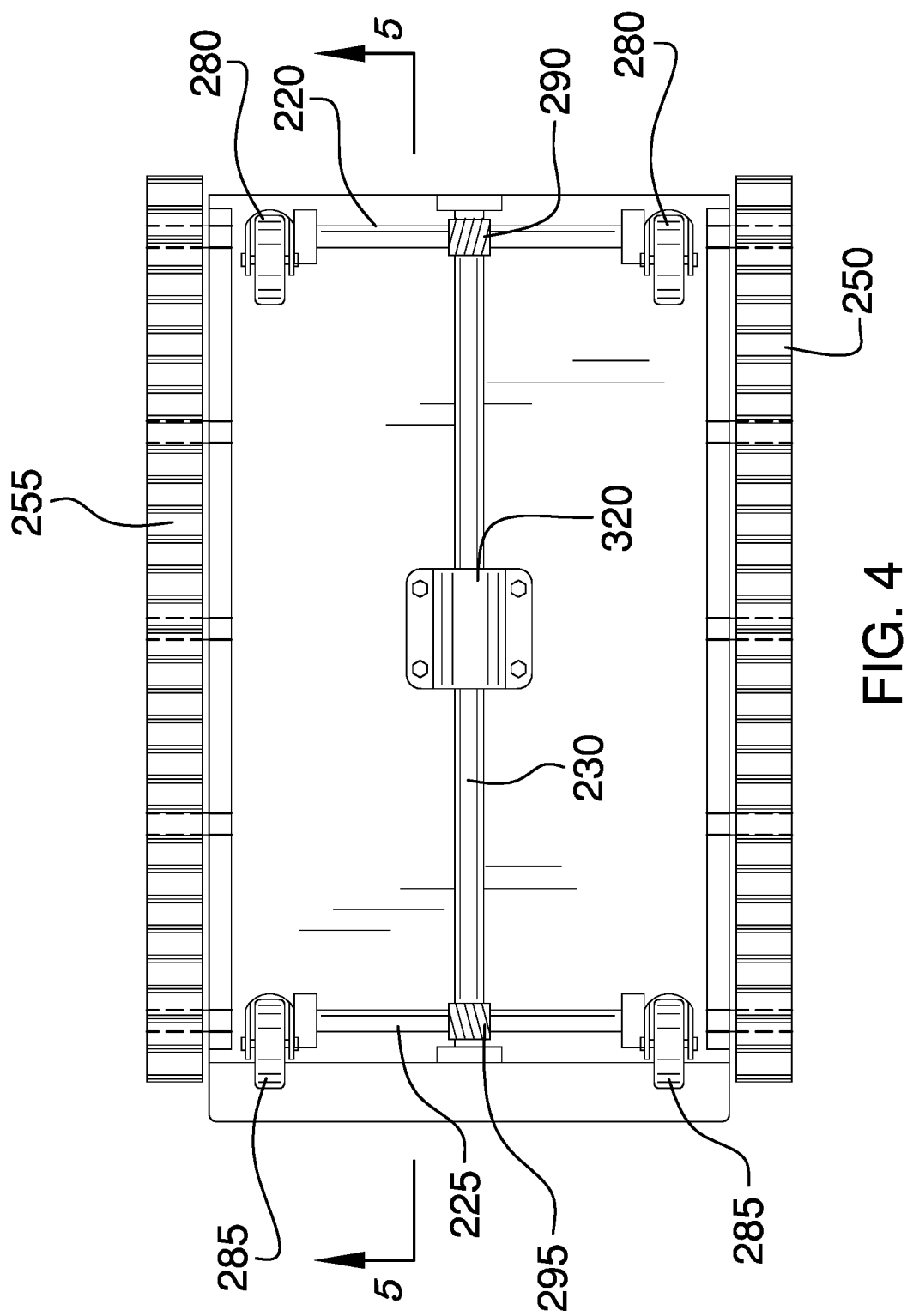
FIG. 4 is a bottom view of an embodiment of the disclosure.
Figure 5:
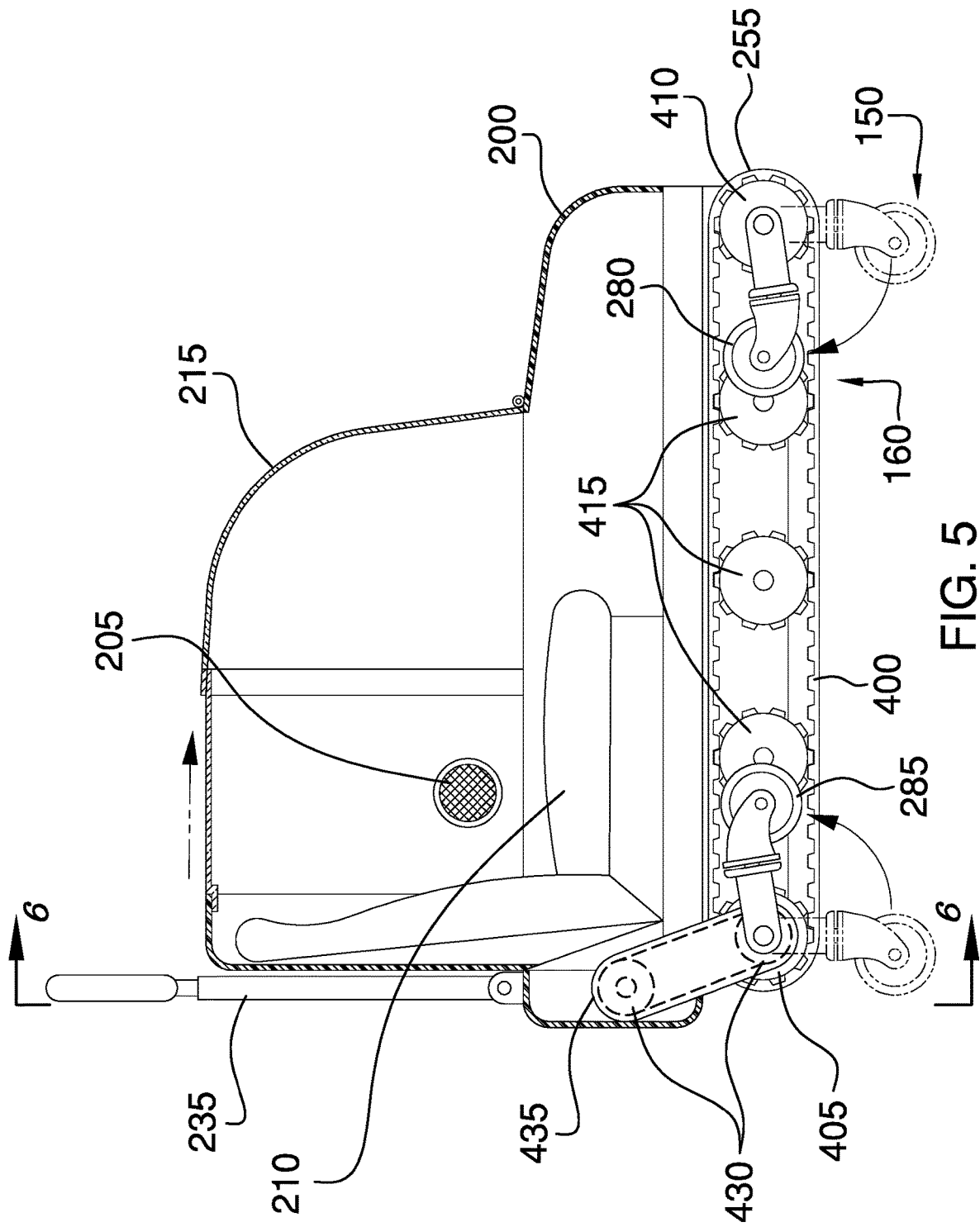
FIG. 5 is a cross-sectional view of an embodiment of the disclosure across 5-5 as shown in FIG. 4.
Figure 6:
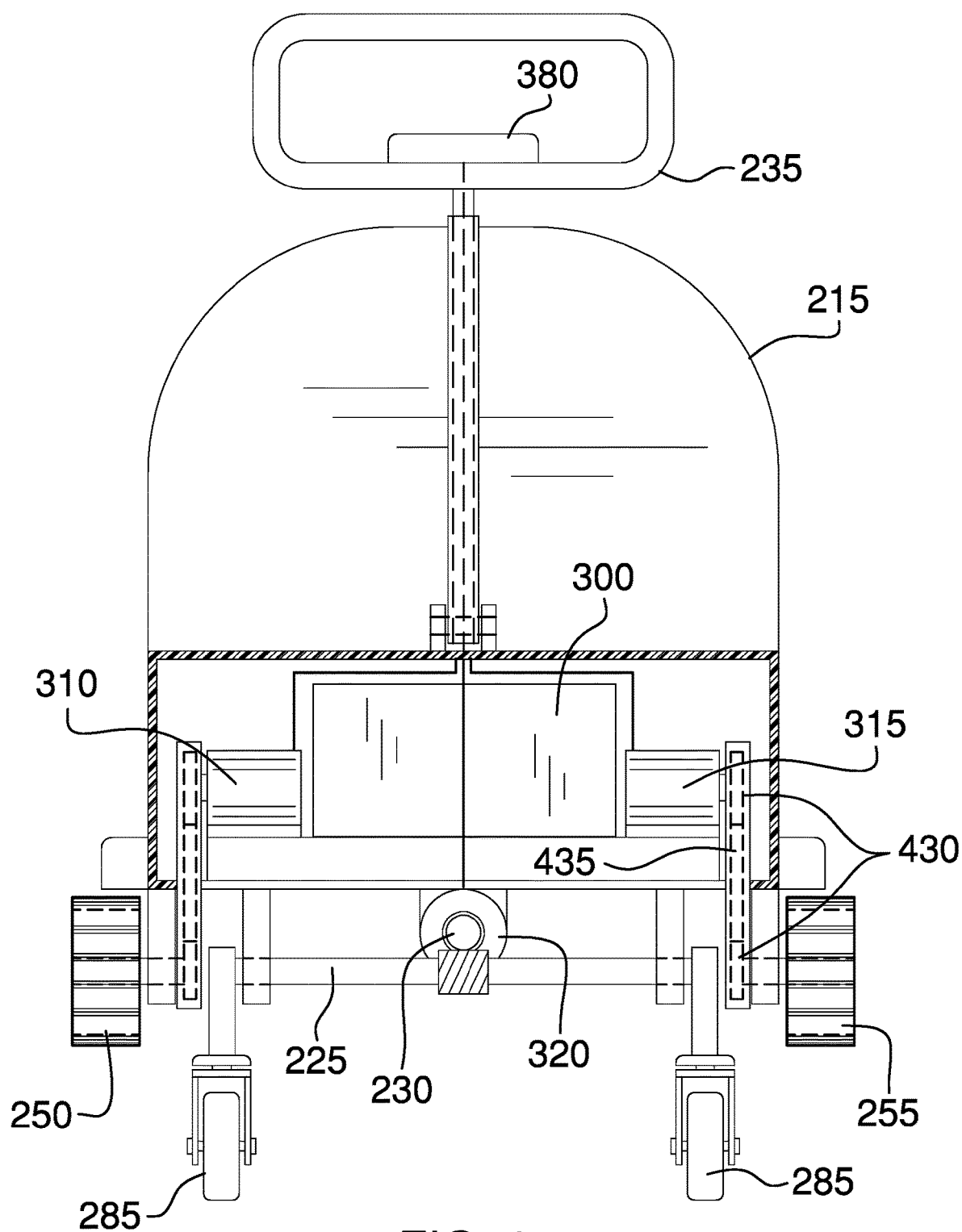
FIG. 6 is a cross-sectional view of an embodiment of the disclosure across 6-6 as shown in FIG. 5.

Detailed reference will now be made to a first potential embodiment of the disclosure, which is illustrated in FIGS. 1 through 6.

The stair-climbing stroller 100 (hereinafter invention) comprises a stroller body 200, two front wheels 280, two rear wheels 285, a front wheel support shaft 220, a rear wheel support shaft 225, a front gear assembly 290, a rear gear assembly 295, a retraction drive shaft 230, a wheel retract motor 320, a left track drive motor 310, a right track drive motor 315, one or more batteries 300, a left track 250, and a right track 255. The invention 100 is adapted to be a conveyance for an infant or toddler (not illustrated in the figures). The invention 100 may ride on the two front wheels 280 and the two rear wheels 285 to move over a flat travel surface. The invention 100 may ride on the left track 250 and the right track 255 to ascend or descend an inclined travel surface, including, but not limited to, a staircase. The two front wheels 280 and the two rear wheels 285 may retract so that the left track 250 and the right track 255 may contact the inclined travel surface.

The stroller body 200 may be adapted to be an enclosure surrounding the infant or toddler. The stroller body 200 may be open at the top to provide access to a passenger compartment 210 located within the stroller body 200. The passenger compartment 210 may be a seat, a mattress, or padding adapted for the infant or toddler to sit or recline upon.

The stroller body 200 may conceal hardware located beneath the passenger compartment 210. As non-limiting examples, the stroller body 200 may cover the left track drive motor 310, the right track drive motor 315, the wheel retract motor 320, the front wheel support shaft 220, the rear wheel support shaft 225, the retraction drive shaft 230, and the one or more batteries 300.

The stroller body 200 may comprise a canopy 215. The canopy 215 may be a transparent cover over the top of the stroller body 200. The canopy 215 may be adapted to provide protection for the infant or toddler from the sun, wind, and insects. The canopy 215 may comprise one or more air vents 205 to allow circulation of fresh air within the passenger compartment 210. The canopy 215 may be hingedly coupled to the top of the stroller body 200.

The stroller body 200 may comprise a telescopic handle 235. The telescopic handle 235 may be coupled to the rear of the stroller body 200 and may extend up to a height above the stroller body 200. The telescopic handle 235 may be used to push and steer the invention.

The telescopic handle 235 may comprise an operator control panel 380. The operator control panel 380 may provide a plurality of operator controls 385 that control operation of the invention. Specifically, the plurality of operator controls 385 may cause retraction or extension of the two front wheels 280 and the two rear wheels 285. The plurality of operator controls 385 may cause the left track 250 to turn in a direction to cause forward motion, to turn in a direction to cause rearward motion, or to stop. The plurality of operator controls 385 may cause the right track 255 to turn in a direction to cause forward motion, to turn in a direction to cause rearward motion, or to stop. In some embodiments, the operator control panel 380 may comprise an on-off control, a power indicator, a battery state indicator, or combinations thereof. The on-off control may apply or remove electricity from the one or more batteries 300 to the operator control panel 380. The power indicator may indicate whether the on-off control is in an on position. The battery state indicator may indicate the charge state of the one or more batteries 300 or may indicate at least a low-charge state.

The two front wheels 280 may be swivel wheels or casters that are pivotably mounted to the front wheel support shaft 220. The two rear wheels 285 may be swivel wheels or casters that are pivotably mounted to the rear wheel support shaft 225. In some embodiments, the two front wheels 280 may swivel to change directions while the two rear wheels 285 may be fixed to travel in a straight line.

When in an extended mode 150, the two front wheels 280 and the two rear wheels 285 may extend vertically downward from the front wheel support shaft 220 and the rear wheel support shaft 225, respectively. When in the extended mode 150, the distance between the front wheel support shaft 220 and the bottom of the two front wheels 280 may match the distance between the rear wheel support shaft 225 and the bottom of the two rear wheels 285. When in the extended mode 150, the two front wheels 280 and the two rear wheels 285 may lift the invention to a height such that the left track 250 and the right track 255 do not contact the flat travel surface.

When in a retracted mode 160, the front wheel support shaft 220 may turn in a direction that pivots the two front wheels 280 up and to the rear. When in the retracted mode 160, the rear wheel support shaft 225 may turn in a direction that pivots the two rear wheels 285 up and to the front. As the two front wheels 280 and the two rear wheels 285 pivot they may lower the invention such that the left track 250 and the right track 255 contact the flat travel surface. The two front wheels 280 and the two rear wheels 285 may continue to pivot until they are pointed at each other and at a height such that they do not contact the flat travel surface.

The front gear assembly 290 may redirect rotation of the retraction drive shaft 230 by 90 degrees at the front of the retraction drive shaft 230. Specifically the front gear assembly 290 may transfer rotational energy of the retraction drive shaft 230 to the front wheel support shaft 220. The rear gear assembly 295 may redirect rotation of the retraction drive shaft 230 by 90 degrees the rear of the retraction drive shaft 230. Specifically the rear gear assembly 295 may transfer rotational energy of the retraction drive shaft 230 to the rear wheel support shaft 225. The front gear assembly 290 and the rear gear assembly 295 may each be any arrangement of gears known in the art to redirect rotational motion by 90 degrees. As non-limiting examples, the front gear assembly 290 and the rear gear assembly 295 may comprise one or more worm gears or one or more bevel gears.

The retraction drive shaft 230 may run horizontally from the front of the stroller body 200 to the rear of the stroller body 200. The retraction drive shaft 230 may be supported at each end by a bearing.

The wheel retract motor 320 may convert electrical energy into mechanical energy. The wheel retract motor 320 may cause rotation of the retraction drive shaft 230 when electrical energy is applied to the wheel retract motor 320. The electrical energy applied to the wheel retract motor 320 may be controlled by the operator control panel 380. The wheel retract motor 320 may be mounted to the bottom center of the stroller body 200. The wheel retract motor 320 may be coupled either directly or indirectly to the retraction drive shaft 230.

When the wheel retract motor 320 is energized to turn in a first direction, rotation of the retraction drive shaft 230 is transferred to the front wheel support shaft 220 and to the rear wheel support shaft 225 such that the two front wheels 280 and the two rear wheels 285 retract. When the wheel retract motor 320 is energized to turn in a second direction, rotation of the retraction drive shaft 230 is transferred to the front wheel support shaft 220 and to the rear wheel support shaft 225 such that the two front wheels 280 and the two rear wheels 285 extend. A hand crank 240 maybe coupled to the retraction drive shaft 230 at the rear of the stroller body 200 to manually retract or extend the two front wheels 280 and the two rear wheels 285.

The left track drive motor 310 may convert electrical energy into mechanical energy. The left track drive motor 310 may cause rotation of the left track 250 when electrical energy is applied to the left track drive motor 310. The electrical energy applied to the left track drive motor 310 may be controlled by the operator control panel 380.

The right track drive motor 315 may convert electrical energy into mechanical energy. The right track drive motor 315 may cause rotation of the right track 255 when electrical energy is applied to the right track drive motor 315. The electrical energy applied to the right track drive motor 315 may be controlled by the operator control panel 380.

The one or more batteries 300 may comprise one or more energy-storage devices. The one or more batteries 300 may be a source of electrical energy to operate the left track drive motor 310, the right track drive motor 315, and the wheel retract motor 320. The one or more batteries 300 may be replaceable or rechargeable.

The left track 250 may be located on the lower, left side of the stroller body 200. The right track 255 may be located on the lower, right side of the stroller body 200. When the two front wheels 280 and the two rear wheels 285 are in the retracted mode 160, the left track 250 and the right track 255 may contact the flat travel surface and may support the weight of the invention 100.

A detailed description of a track is given next. The track may be either the left track 250 or the right track 255. The left track 250 and the right track 255 are mirror-images of each other relative to a vertical, longitudinal center plane running through the invention 100. The track will be used to avoid reference to either the left track 250 or the right track 255 and statements made regarding the track may be interpreted as being applicable to either the left track 250 or the right track 255 unless stated otherwise.

The track comprises a track belt 400, a drive sprocket 405, an idler 410, and a plurality of roller sprockets 415. The track belt 400 may be a continuous and endless loop of synthetic rubber. In some embodiments, the track belt 400 may be reinforced with steel wire. The track belt 400 may form a travel surface for the drive sprocket 405, the idler 410, and the plurality of roller sprockets 415 to move over. As the invention 100 moves forward, the rear edge of the track belt 400 is pulled up and moves forward to the front of the track where it descends in front of the track to be used again.

The track belt 400 may comprise toothed ridges oriented laterally on the interior of the track belt 400. The track belt 400 may comprise ridges or other contours on the exterior surface of the track belt 400 to increase friction between the track belt 400 and the inclined travel surface.

The drive sprocket 405 may be a wheel that is driven, directly or indirectly, by a track motor. The track belt may be forced to move by rotation of the drive sprocket. The drive sprocket 405 may comprise a series of lateral grooves that engage with the toothed ridges on the track belt 400. As non-limiting examples, the drive sprocket 405 may be driven by a pair of pulleys 430 and a track drive belt 435 between the drive sprocket 405 and the track motor or by a pair of gears and a chain between the drive sprocket 405 and the track motor. The track motor may be the left track drive motor 310 or the right track drive motor 315.

The idler 410 may be a wheel that guides the track belt 400 at the opposite end of the track belt 400 from the drive sprocket 405. In some embodiments, the idler 410 may be spring-loaded and may keep the track belt 400 under tension. The plurality of roller sprockets 415 may be wheels that guide and support the track belt 400 between the drive sprocket 405 and the idler 410.

The drive sprocket 405, the plurality of roller sprockets 415, and the idler 410 may be pivotably coupled to the stroller body 200 in an evenly spaced, linear formation from front to rear.

In use, the two front wheels 280 and the two rear wheels 285 may be extended using the hand crank 240 or using the wheel retract motor 320 controlled from the operator control panel 380. The canopy 215 may be opened, the infant or toddler may be placed into the passenger compartment 210, the canopy 215 may be closed, and the invention 100 may then be pushed by the telescopic handle 235 over the flat travel surface.

Upon reaching the inclined travel surface such as the staircase, the two front wheels 280 and the two rear wheels 285 may be retracted, lowering the left track 250 and the right track 255 onto the flat travel surface. The invention 100 may then be driven forward using the left track drive motor 310 and the right track drive motor 315 and may ascend the inclined travel surface. The left track 250 and the right track 255 may be independently activated by energizing the left track drive motor 310 and the right track drive motor 315 individually. To drive the invention straight up the inclined travel surface, both the left track drive motor 310 and the right track drive motor 315 may be activated to move their respective tracks in the same direction. To turn, one track may be activated while the other track is not activated or both tracks may be activated but in opposite directions.

Definitions

Unless otherwise stated, the words "up", "down", "top", "bottom", "upper", and "lower" should be interpreted within a gravitational framework. "Down" is the direction that gravity would pull an object. "Up" is the opposite of "down". "Bottom" is the part of an object that is down farther than any other part of the object. "Top" is the part of an object that is up farther than any other part of the object. "Upper" refers to top and "lower" refers to the bottom. As a non-limiting example, the upper end of a vertical shaft is the top end of the vertical shaft.

Throughout this document the terms "battery", "battery pack", and "batteries" may be used interchangeably to refer to one or more wet or dry cells or batteries of cells in which chemical energy is converted into electricity and used as a source of DC power. References to recharging or replacing batteries may refer to recharging or replacing individual cells, individual batteries of cells, or a package of multiple battery cells as is appropriate for any given battery technology that may be used. The battery may require electrical contacts which may not be illustrated in the figures.

As used in this disclosure, a "bearing" is anything that holds a rotating or sliding shaft. A bearing may guide a moving component, limit the motion of a moving component relative to a fixed component and/or reduce the friction between the moving component and the fixed component.

As used herein, the words "control" or "controls" are intended to include any device which can cause the completion or interruption of an electrical circuit; non-limiting examples of controls include toggle switches, rocker switches, push button switches, rotary switches, electromechanical relays, solid state relays, touch sensitive interfaces and combinations thereof whether they are normally open, normally closed, momentary contact, latching contact, single pole, multi-pole, single throw, or multi-throw.

As used herein, the words "couple", "couples", "coupled" or "coupling", refer to connecting, either directly or indirectly, and does not necessarily imply a mechanical connection.

As used in this disclosure, a "crank" is a handle or an arm that is attached perpendicularly to the axis of rotation of a shaft and that is used for transmitting rotary motion to the shaft.

As used in this disclosure, the word "exterior" is used as a relational term that implies that an object is not located or contained within the boundary of a structure or a space.

As used herein, "front" indicates the side of an object that is closest to a forward direction of travel under normal use of the object or the side or part of an object that normally presents itself to view or that is normally used first. "Rear" or "back' refers to the side that is opposite the front.

As used in this disclosure, a "gear" is a toothed wheel, cylinder, or other toothed mechanical element that is used to transmit motion, a change of speed, or a change of direction to second toothed wheel, cylinder, or other toothed mechanical element.

As used in this disclosure, a "handle" is an object by which a tool, object, or door is held or manipulated with the hand.

As used in this disclosure, the word "interior" is used as a relational term that implies that an object is located or contained within the boundary of a structure or a space.

As used in this disclosure, the word "lateral" refers to the sides of an object or movement towards a side. Lateral directions are generally perpendicular to longitudinal directions. "Laterally" refers to movement in a lateral direction.

As used herein, the word "longitudinal" or "longitudinally" refers to a lengthwise or longest direction.

As used in this disclosure, a "motor" refers to a device that transforms energy from an external power source into mechanical energy.

As used herein, the word "pivot" is intended to include any mechanical arrangement that allows for rotational motion. Non-limiting examples of pivots may include hinges, holes, posts, dowels, pins, points, rods, shafts, balls, and sockets, either individually or in combination.

As used in this disclosure, a "roller" is a revolving cylindrical device, which is used to move an object.

As used in this disclosure, the term "shaft" is used to describe a rigid cylinder that is often used as the handle of a tool or implement. The definition of shaft explicitly includes solid shafts or shafts that comprise a hollow passage through the shaft along the center axis of the shaft cylinder, whether the shaft has one or more sealed ends or not.

As used in this disclosure, "telescopic" is an adjective that describes an object made of sections that fit or slide into each other such that the object can be made longer or shorter by adjusting the relative positions of the sections.

As used in this disclosure, "transparent" refers to a material that allows light to pass through the material without significant scattering such that an object can be clearly seen through the material.

As used in this disclosure, "vertical" refers to a direction that is parallel to the local force of gravity. Unless specifically noted in this disclosure, the vertical direction is always perpendicular to horizontal.

As used in this disclosure, a "wheel" is a circular object that revolves around an axle or an axis and is fixed below an object to enable it to move easily over the ground.

With respect to the above description, it is to be realized that the optimum dimensional relationship for the various components of the invention described above and in FIGS. 1 through 6, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A stair-climbing stroller comprising:
a stroller body, two front wheels, two rear wheels, a front wheel support shaft, a rear wheel support shaft, a front gear assembly, a rear gear assembly, a retraction drive shaft, a wheel retract motor, a left track drive motor, a right track drive motor, one or more batteries, a left track, and a right track;
wherein the stair-climbing stroller is adapted to be a conveyance for an infant or toddler;
wherein the stair-climbing stroller rides on the two front wheels and the two rear wheels to move over a flat travel surface;
wherein the stair-climbing stroller rides on the left track and the right track to ascend or descend an inclined travel surface, including, but not limited to, a staircase;
wherein the two front wheels and the two rear wheels retract so that the left track and the right track contact the inclined travel surface;
wherein when in an extended mode, the two front wheels and the two rear wheels extend vertically downward from the front wheel support shaft and the rear wheel support shaft, respectively;
wherein when in the extended mode, the distance between the front wheel support shaft and the bottom of the two front wheels matches the distance between the rear wheel support shaft and the bottom of the two rear wheels;
wherein when in the extended mode, the two front wheels and the two rear wheels lift the stroller body to a height such that the left track and the right track do not contact the flat travel surface;
wherein when in a retracted mode, the front wheel support shaft turns in a direction that pivots the two front wheels up and to the rear;
wherein when in the retracted mode, the rear wheel support shaft turns in a direction that pivots the two rear wheels up and to the front;
wherein as the two front wheels and the two rear wheels pivot they lower the stroller body such that the left track and the right track contact the flat travel surface;
wherein the two front wheels and the two rear wheels continue to pivot until they are pointed at each other and at a height such that they do not contact the flat travel surface.

2. The stair-climbing stroller according to claim 1
wherein the stroller body is adapted to be an enclosure surrounding the infant or toddler;
wherein the stroller body is open at the top to provide access to a passenger compartment located within the stroller body;
wherein the passenger compartment is a seat, a mattress, or padding adapted for the infant or toddler to sit or recline upon;
wherein the stroller body conceals hardware located beneath the passenger compartment.

3. The stair-climbing stroller according to claim 2
wherein the stroller body comprises a canopy;
wherein the canopy is a transparent cover over the top of the stroller body;
wherein the canopy is adapted to provide protection for the infant or toddler from the sun, wind, and insects;
wherein the canopy comprises one or more air vents to allow circulation of fresh air within the passenger compartment;

wherein the canopy is hingedly coupled to the top of the stroller body;

wherein the stroller body comprises a telescopic handle;

wherein the telescopic handle is coupled to the rear of the stroller body and extends up to a height above the stroller body;

wherein the telescopic handle is used to push and steer the stroller body.

4. The stair-climbing stroller according to claim 3 wherein the telescopic handle comprises an operator control panel;

wherein the operator control panel provides a plurality of operator controls that control operation of the stroller body;

wherein the plurality of operator controls cause retraction or extension of the two front wheels and the two rear wheels;

wherein the plurality of operator controls cause the left track to turn in a direction to cause forward motion, to turn in a direction to cause rearward motion, or to stop;

wherein the plurality of operator controls cause the right track to turn in a direction to cause forward motion, to turn in a direction to cause rearward motion, or to stop.

5. The stair-climbing stroller according to claim 4 wherein the operator control panel comprises an on-off control, a power indicator, a battery state indicator, or combinations thereof.

6. The stair-climbing stroller according to claim 4 wherein the two front wheels are swivel wheels or casters that are pivotably mounted to the front wheel support shaft;

wherein the two rear wheels are swivel wheels or casters that are pivotably mounted to the rear wheel support shaft.

7. The stair-climbing stroller according to claim 6 wherein the two front wheels swivel to change directions while the two rear wheels are fixed to travel in a straight line.

8. The stair-climbing stroller according to claim 7 wherein the front gear assembly redirects rotation of the retraction drive shaft by 90 degrees at the front of the retraction drive shaft;

wherein the front gear assembly transfers rotational energy of the retraction drive shaft to the front wheel support shaft;

wherein the rear gear assembly redirects rotation of the retraction drive shaft by 90 degrees the rear of the retraction drive shaft;

wherein the rear gear assembly transfers rotational energy of the retraction drive shaft to the rear wheel support shaft;

wherein the front gear assembly and the rear gear assembly comprise one or more worm gears or one or more bevel gears;

wherein the retraction drive shaft runs horizontally from the front of the stroller body to the rear of the stroller body;

wherein the retraction drive shaft is supported at each end by a bearing.

9. The stair-climbing stroller according to claim 8 wherein the wheel retract motor converts electrical energy into mechanical energy;

wherein the wheel retract motor causes rotation of the retraction drive shaft when electrical energy is applied to the wheel retract motor;

wherein the electrical energy applied to the wheel retract motor is controlled by the operator control panel;

wherein the wheel retract motor is mounted to the bottom center of the stroller body;

wherein the wheel retract motor is coupled either directly or indirectly to the retraction drive shaft.

10. The stair-climbing stroller according to claim 9 wherein when the wheel retract motor is energized to turn in a first direction, rotation of the retraction drive shaft is transferred to the front wheel support shaft and to the rear wheel support shaft such that the two front wheels and the two rear wheels retract;

wherein when the wheel retract motor is energized to turn in a second direction, rotation of the retraction drive shaft is transferred to the front wheel support shaft and to the rear wheel support shaft such that the two front wheels and the two rear wheels extend;

wherein a hand crank is coupled to the retraction drive shaft at the rear of the stroller body to manually retract or extend the two front wheels and the two rear wheels.

11. The stair-climbing stroller according to claim 10 wherein the left track drive motor converts electrical energy into mechanical energy;

wherein the left track drive motor causes rotation of the left track when electrical energy is applied to the left track drive motor;

wherein the electrical energy applied to the left track drive motor is controlled by the operator control panel;

wherein the right track drive motor converts electrical energy into mechanical energy;

wherein the right track drive motor causes rotation of the right track when electrical energy is applied to the right track drive motor;

wherein the electrical energy applied to the right track drive motor is controlled by the operator control panel.

12. The stair-climbing stroller according to claim 11 wherein the one or more batteries comprise one or more energy-storage devices;

wherein the one or more batteries are a source of electrical energy to operate the left track drive motor, the right track drive motor, and the wheel retract motor;

wherein the one or more batteries are replaceable or rechargeable.

13. The stair-climbing stroller according to claim 12 wherein the left track is located on the lower, left side of the stroller body;

wherein the right track is located on the lower, right side of the stroller body;

wherein when the two front wheels and the two rear wheels are in the retracted mode, the left track and the right track contact the flat travel surface and support the weight of the stair-climbing stroller.

14. The stair-climbing stroller according to claim 13 wherein the left track and the right track are mirror-images of each other relative to a vertical, longitudinal center plane running through the stair-climbing stroller.

15. The stair-climbing stroller according to claim 14 wherein a track comprises a track belt, a drive sprocket, an idler, and a plurality of roller sprockets;

wherein the track is the left track or the right track;

wherein the track belt is a continuous and endless loop of synthetic rubber;

wherein the track belt forms a travel surface for the drive sprocket, the idler, and the plurality of roller sprockets to move over;

wherein as the stair-climbing stroller moves forward, the rear edge of the track belt is pulled up and moves forward to the front of the track where it descends in front of the track to be used again.

16. The stair-climbing stroller according to claim 15
wherein the track belt comprises toothed ridges oriented laterally on the interior of the track belt;
wherein the track belt comprises ridges or other contours on the exterior surface of the track belt to increase friction between the track belt and the inclined travel surface.

17. The stair-climbing stroller according to claim 16
wherein the drive sprocket is a wheel that is driven, directly or indirectly, by a track motor;
wherein the track belt is forced to move by rotation of the drive sprocket;
wherein the drive sprocket comprises a series of lateral grooves that engage with the toothed ridges on the track belt;
wherein the track motor is the left track drive motor or the right track drive motor.

18. The stair-climbing stroller according to claim 17
wherein the idler is a wheel that guides the track belt at the opposite end of the track belt from the drive sprocket;
wherein the plurality of roller sprockets are wheels that guide and support the track belt between the drive sprocket and the idler;
wherein the drive sprocket, the plurality of roller sprockets, and the idler are pivotably coupled to the stroller body in an evenly spaced, linear formation from front to rear.

19. The stair-climbing stroller according to claim 18 wherein the idler is spring-loaded and keeps the track belt under tension.

\* \* \* \* \*